W. A. GRANT.
WIRE SPACING ATTACHMENT FOR BALING PRESSES.
APPLICATION FILED FEB. 1, 1917.
1,277,306.
Patented Aug. 27, 1918.
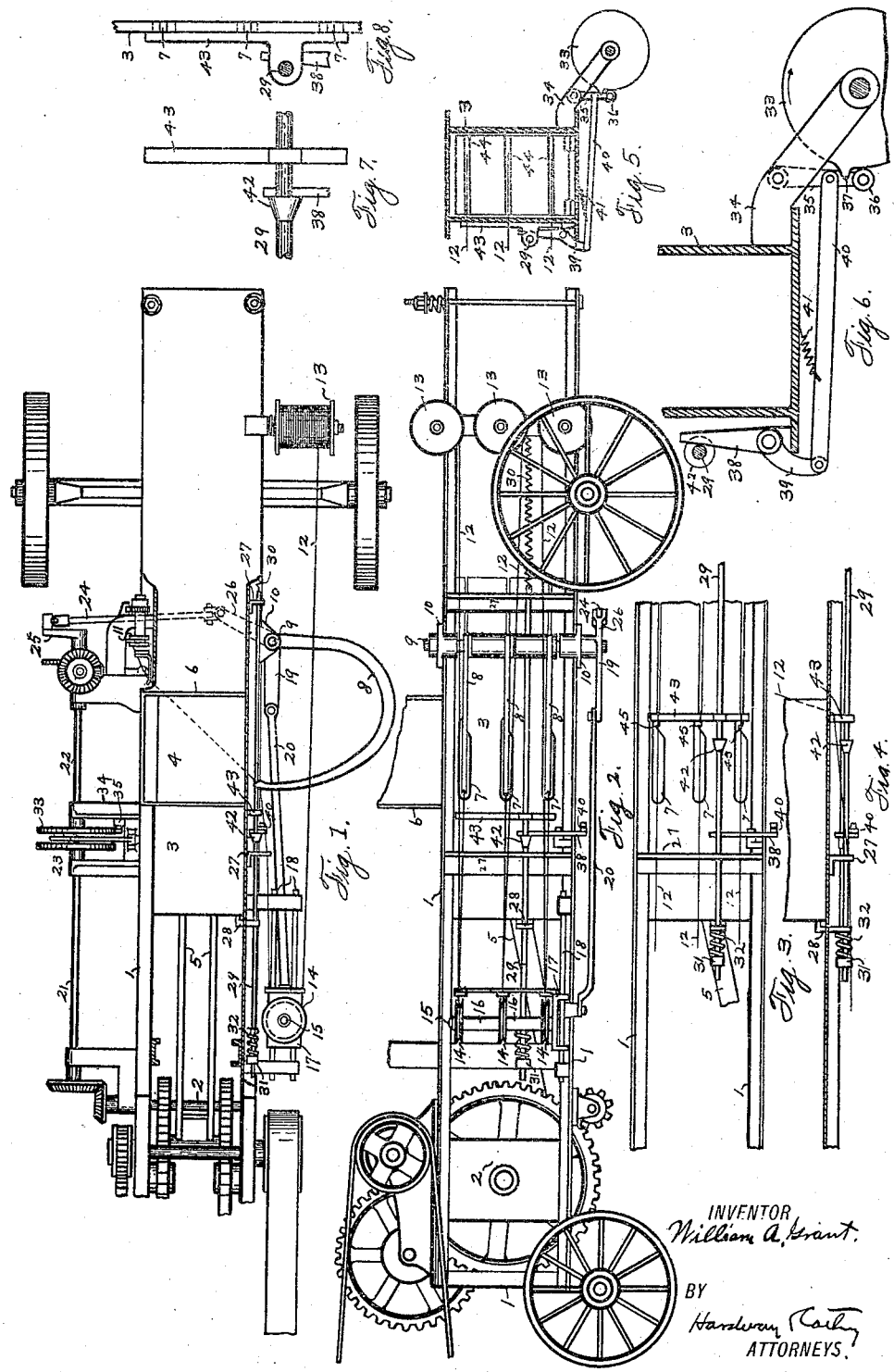
INVENTOR
William A. Grant.
BY
Hardway Carly
ATTORNEYS.

UNITED STATES PATENT OFFICE.

WILLIAM A. GRANT, OF HOUSTON, TEXAS.

WIRE-SPACING ATTACHMENT FOR BALING-PRESSES.

1,277,306. Specification of Letters Patent. Patented Aug. 27, 1918.

Application filed February 1, 1917. Serial No. 145,899.

*To all whom it may concern:*

Be it known that I, WILLIAM A. GRANT, a citizen of the United States, residing at Houston, in the county of Harris and State of Texas, have invented certain new and useful Improvements in Wire-Spacing Attachments for Baling-Presses, of which the following is a specification.

This invention relates to new and useful improvements in a wire spacing attachment for baling presses.

The object of the invention is to provide an attachment of the character described adapted to be applied to baling machines, such as are employed for baling hay and other like material for the purpose of spacing the baling wire across the chamber in front of the receiving hopper before beginning the formation of a bale so as to prevent the accumulation of loose material between the bales being formed, and also prevent the disarrangement of the wires.

Another feature of the invention resides in the provision of an attachment of the character described that will automatically operate to space said wire immediately after the completion of a bale preparatory to the formation of another bale.

Another feature of the invention resides in the provision of an attachment of the character described that will be simple in construction and that will operate easily, positively and automatically.

With the above and other objects in view, the invention has particular relation to certain novel features of construction, operation and arrangement of parts, an example of which is given in this specification and illustrated in the accompanying drawings wherein:—

Figure 1 is a plan view of a press with the attachment applied thereto.

Fig. 2 is a side elevation thereof.

Fig. 3 is a fragmentary side elevation thereof.

Fig. 4 is a fragmentary plan view thereof.

Fig. 5 is a transverse sectional view thereof.

Fig. 6 is an enlarged transverse sectional view thereof.

Fig. 7 is a fragmentary side view of the attachment and,

Fig. 8 is a fragmentary view thereof as viewed from the discharge end of the press.

Referring now more particularly to the drawings wherein like numerals of reference designate similar parts in each of the figures, the numeral 1 refers to the frame work of the press which is composed of suitable side and end members and in general contour is of the ordinary and well known form. At one end of the frame work is mounted the driving mechanism indicated by the numeral 2 and being of the usual construction it is not deemed to be necessary to describe the same in detail. The numeral 3 refers to the baling chamber which is supported by the frame work and which has the plunger 4 reciprocating therein, actuated through the connecting rods 5 in the well known manner. The baling chamber receives the material to be compressed through the hopper 6 which is mounted thereon and said chamber has the side slots 7, 7, 7, in each side thereof through which the corresponding needles 8, 8, 8, pass. These needles are fixed on the vertical shaft 9 rotatably mounted in suitable bearings 10, 10, which are fixed to the side of the baling chamber. Fixed to the opposite side of said chamber are wire twisting devices as 11, in alinement with and coöperating with the respective needles to secure the wires 12, 12, 12, around the bale in the usual manner. These wires are stored on storage spools 13, 13, 13, and pass around the sheaves 14, 14, 14, thence through the needle eyes, their free ends passing through the side slots 7, 7, 7, and being attached to the corresponding twisters 11. The sheaves 14 are loosely mounted upon a vertical rod 15 and are held spaced apart thereon by means of the sleeves 16, 16, said rod being secured to a platform 17 which is slidably mounted upon a stationary track 18. The lower end of the shaft 9 has an arm 19 fixed thereto and a link 20 is pivoted at one end to the free end of said arm and at the other end to the said platform. When the needles are driven through the chamber to carry the securing wires around the bale and into coöperation with the twisters, the arm 19 swings around and operates through the link 20 to pull the platform 17, and the sheaves 14 mounted thereon toward the needles, thus providing a certain amount of slack in said wires so as to prevent too sudden a pull against the wires by the needles, thus obviating the liability of breaking the wires or spinning the storage spools 13 and thereby unwinding too much wire from them. When the needles are withdrawn from the baling chamber, the arm 19 operates through the link 20 to force said sheaves in the opposite direction and gradually unwind the wire from the storage spools. The twisters are driven from the driving mechanism 2 through the shafts 21 and 22, which may be operatively connected to and disconnected from the clutch mechanism 23 and the needles are driven by means of the connecting link 24, one end of which is pivoted to the crank 25 carried by the shaft 22 and the other end of which is pivoted to the free end of the arm 26 which is fixed to the lower end of the vertical needle shaft 9.

On the side of the baling chamber 3 are the bearing members 27, 27, fixed thereto and the rear end of the plunger has the bearing member 28 fixed thereto, said members being provided with alined bearings through which the rod 29 slides. The pull spring 30 is attached at one end to the forward end of this rod and at its other end is attached to the storage spool frame. The opposite end of the rod 29 has a head 31 and surrounding said rod and resting against said head is the coil spring 32 forming a cushion.

The driven member 33 of the clutch 23 is rotatably mounted in the bearing 34 carried by the side of the baling chamber opposite the needles. Pivoted to this bearing 34 is the depending arm 35 the free end of which has the roller bearing 36 in alinement with the cam 37 carried by the periphery of the driven member 33. Pivoted to the opposite side of the baling chamber is a latch 38 having a rigid depending arm 39, said arms 35 and 39 being connected by the link 40. The free end of the latch 38 is normally held against the rod 29 through the influence of the pull spring 41, one end of which is attached to said link and the other end of which is attached to the bottom of the baling chamber. Fixed upon the shaft 29 is an annular shoulder 42 substantially conical shaped whose front side is abrupt and whose rear side is sloping. The rod 29 has the push bar 43 fixed thereon. After the needles are withdrawn from the baling chamber, the wires 12, whose free ends are secured in the twisters will be drawn across said chamber underneath the hopper as shown in Fig. 1, passing through the slots 44, 44, 44, in the forward end of the plunger and when the plunger has been withdrawn, said wires will be in position, unless spaced as hereinafter explained, to receive the said hay delivered through the hopper and part of said hay would fall in front of said wires forming an accumulation of loose hay between the bales and also disarranging said wires. To obviate this, the spacing mechanism herein described has been provided to space said wires in front of the hopper. Immediately after the tying of a bale and the withdrawal of the needles from the chamber, the cam 37 contacts with the roller bearing 36 which operates through the arms 35 and 39 and the link 40 to release the latch 38 from behind the shoulder 42. The rod 29 is thus released to the pull of the spring 30 and the push bar is carried forwardly engaging behind said wires as shown in Fig. 4, and forcing them forwardly into engagement with the catches 45, 45, 45, carried by the side of the baling chamber opposite the twisters. Said catches 45 are not indispensable as when the push bar 43 is driven suddenly against said wires they will be carried forwardly and at the point of contact of said bar therewith will be bent forming an angle and not being resilient will remain in their transverse positions in said chamber after the withdrawal of the push bar therefrom. As the rod 29 is pulled forwardly, the cushion 32 strikes against the bearing member 28 thus minimizing the shock. Upon the back stroke of the plunger the rod 29 and push bar 43 are pulled back to their original positions the latch 38 engaging in front of the shoulder 42 to hold them in said position until again released as hereinabove explained.

What I claim is:

1. A wire spacing attachment embodying a movable spacing member arranged to engage against the wire, a resilient member attached to said spacing member and tending to hold it against the wire, means in operative connection with the spacing member for withdrawing it from said wire, a means for locking said spacing member in its withdrawn position, and means for releasing said locking means.

2. A wire spacing attachment embodying a spacing bar, a yieldable member to which said bar is attached, means in operative connection with the bar for moving the same in opposition to said member, means for locking the bar against the influence of said member, and means for releasing said locking means.

3. A wire spacing attachment embodying a spacing member, yieldable means for moving said spacing member in one direction, and means for releasably locking said spacing member in a given position.

4. In a device of the character described the combination with a baling chamber having a plunger therein, means for securing baling wire around the formed bale, means operating against the baling wire to space the same across the chamber, and an operative connection between the plunger and spacing means whereby the latter is withdrawn from contact with the wire through the operation of the former.

5. The combination with a baling chamber having a plunger, means for securing baling wire around the formed bale, a push bar, a yieldable member tending to force said bar against the baling wire to space same across the chamber, means operatively connected with the bar and operating to withdraw it from the wire, a locking means securing said bar in its withdrawn position, and means for releasing said locking means.

6. A device of the character described including a compress chamber, a compressing mechanism, a wire securing means mounted on one side of said chamber, a co-acting needle mounted on the other side thereof and arranged to move back and forth across said chamber and carry a securing wire therewith, means for operating said securing means and needle, in combination with a movable spacing bar, means actuated by said mechanism for withdrawing said bar, means for locking said spacing bar in its withdrawn position, yieldable means for operating said bar in the opposite direction to said withdrawing means, and means for releasing said bar to its operating means.

7. A device of the character described including a compress chamber, a compressing mechanism, a wire securing means comprising a twister mounted on one side of said chamber, a co-acting needle mounted on the other side thereof and arranged to move back and forth across said chamber and carry a securing wire therewith, means for operating said securing means in combination with a spacing bar, means operated by said mechanism for withdrawing said spacing bar from said wire, means for locking said spacing bar when so withdrawn, yieldable means for operating said spacing bar in the opposite direction to said withdrawing means, means actuated by said operating means for releasing said spacing bar to the influence of said yieldable means and thereby advancing said bar against the wire, and means for retaining said wire in its advanced position.

8. A device of the character described including a compress chamber, a compressing mechanism, a securing means comprising a twister mounted on one side of said chamber, a co-acting needle mounted on the opposite side thereof and arranged to move back and forth across said chamber and carry a securing wire therewith, means for operating said securing means, in combination with a movable spacing bar mounted on one side of said compress chamber, means in operative connection with said mechanism for moving said spacing bar in one direction, yieldable means for moving the same in the opposite direction, means for locking said spacing bar against the influence of said yieldable means, the wire being advanced by said spacing bar, means for retaining said wire in its advanced position, and means actuated by the operating mechanism of said securing means whereby the spacing bar is released to said yieldable means.

In testimony whereof I have signed my name to this specification in the presence of two subscribing witnesses.

WILLIAM A. GRANT.

Witnesses:
L. K. FREEMAN,
A. S. GRANT.

Copies of this patent may be obtained for five cents each, by addressing the "Commissioner of Patents, Washington, D. C."